Oct. 9, 1945.  K. W. COUSE  2,386,597
POWER STRUCTURE
Filed April 15, 1944  7 Sheets—Sheet 1
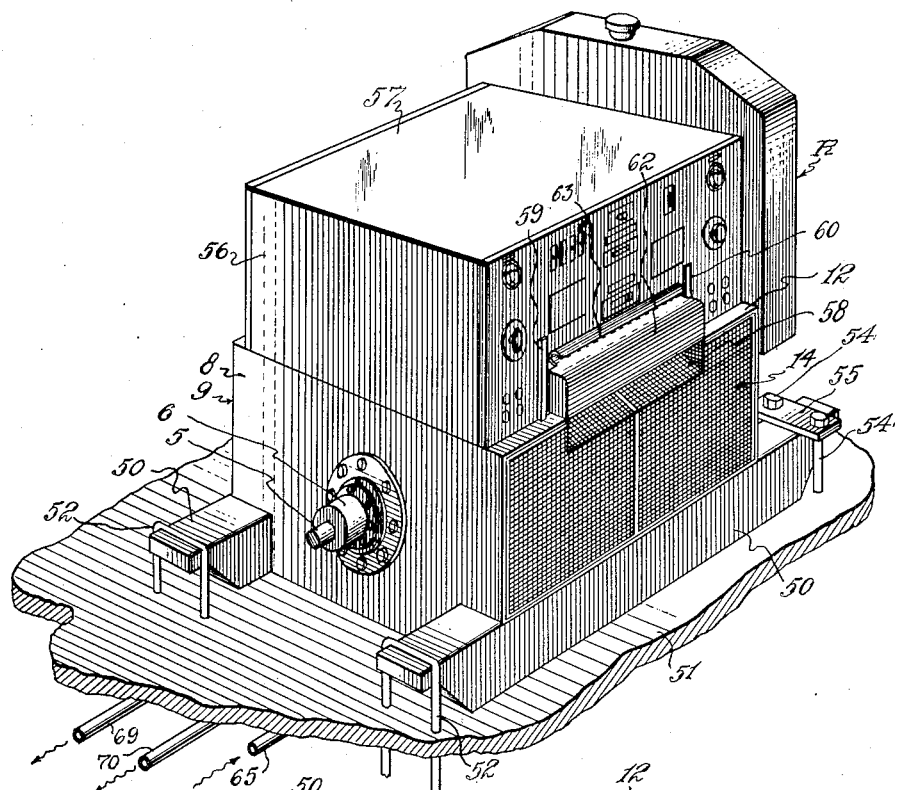
INVENTOR.
Kibbey W. Couse
BY
A. D. T. Libby
Attorney.

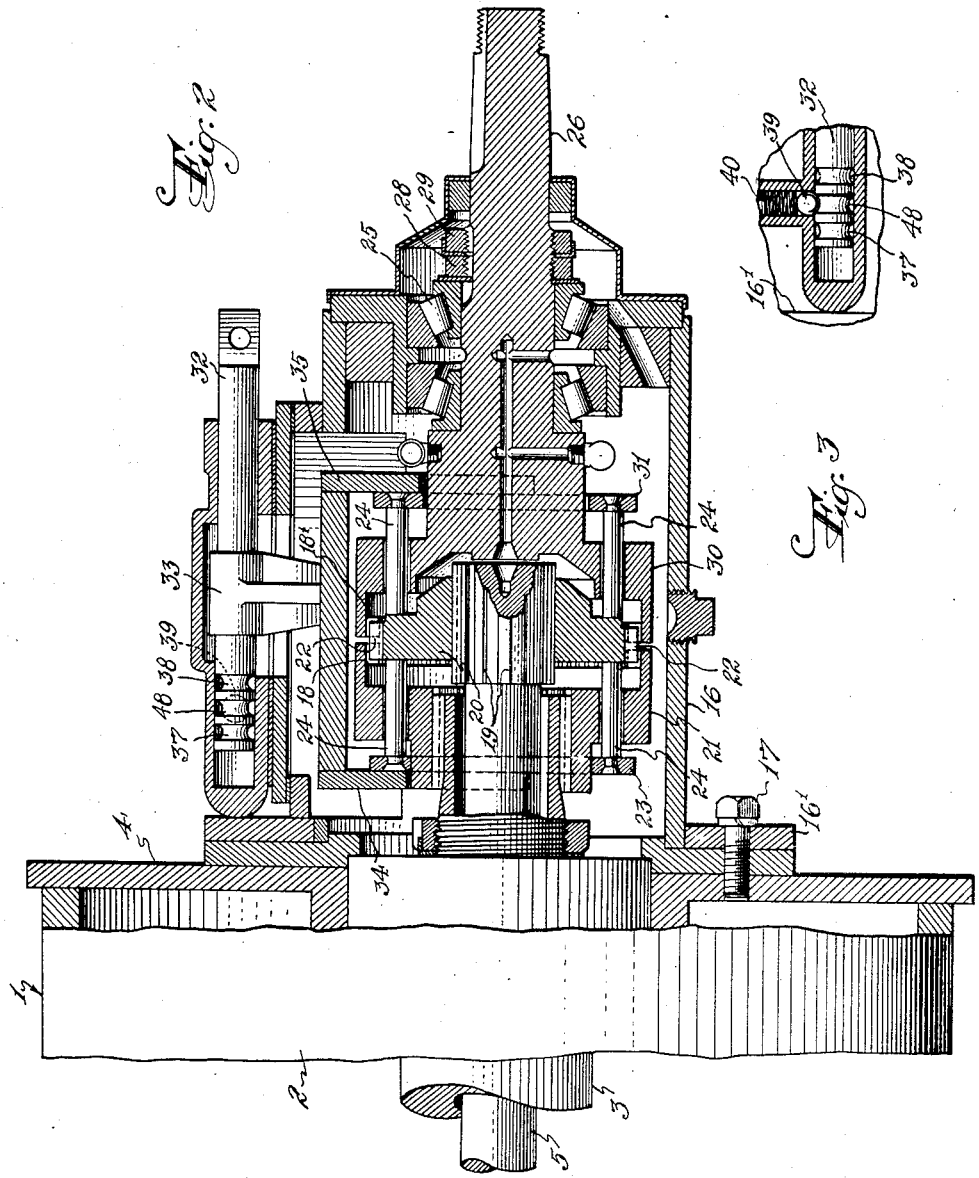

Oct. 9, 1945. K. W. COUSE 2,386,597
POWER STRUCTURE
Filed April 15, 1944 7 Sheets-Sheet 3

INVENTOR.
Kibbey W. Couse
BY
A. D. T. Libby
Attorney.

Oct. 9, 1945. K. W. COUSE 2,386,597
POWER STRUCTURE
Filed April 15, 1944 7 Sheets-Sheet 4

INVENTOR.
Kibbey W. Couse
BY
A. D. T. Libby
Attorney.

Oct. 9, 1945. K. W. COUSE 2,386,597
POWER STRUCTURE
Filed April 15, 1944 7 Sheets-Sheet 5
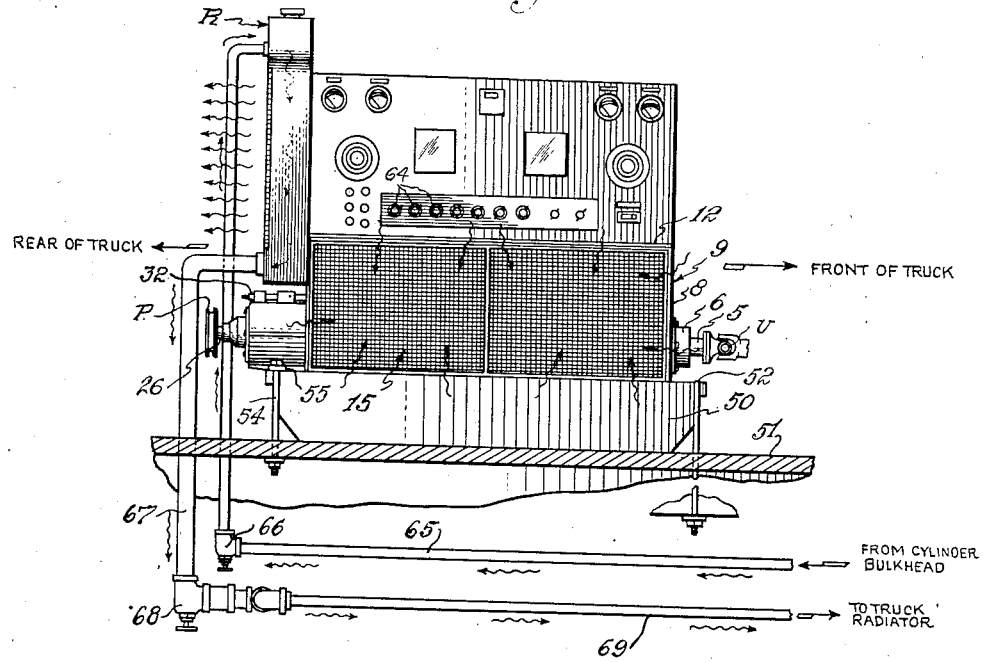
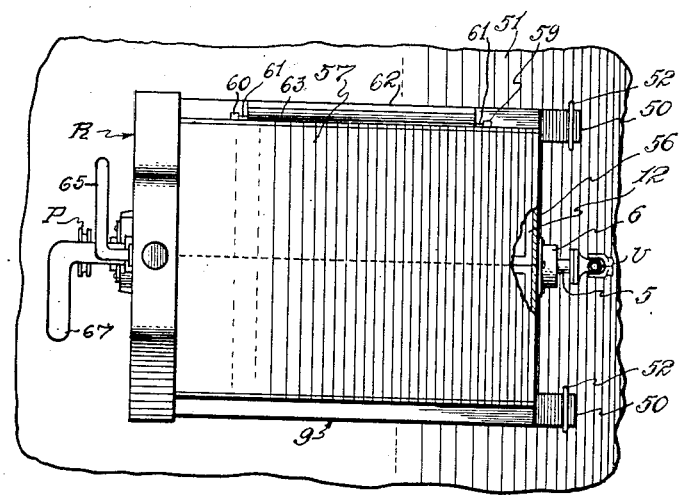
INVENTOR.
Kibbey W. Couse
BY
A. D. T. Libby
Attorney.

Oct. 9, 1945.
K. W. COUSE
2,386,597
POWER STRUCTURE
Filed April 15, 1944
7 Sheets-Sheet 6
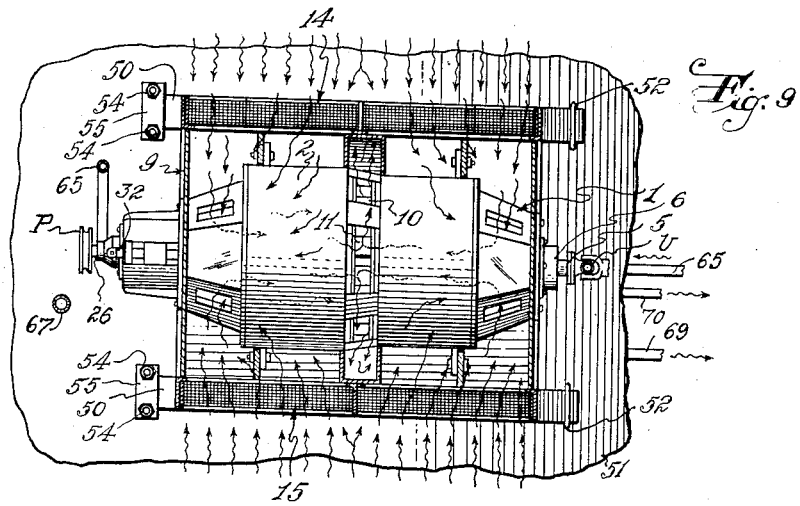
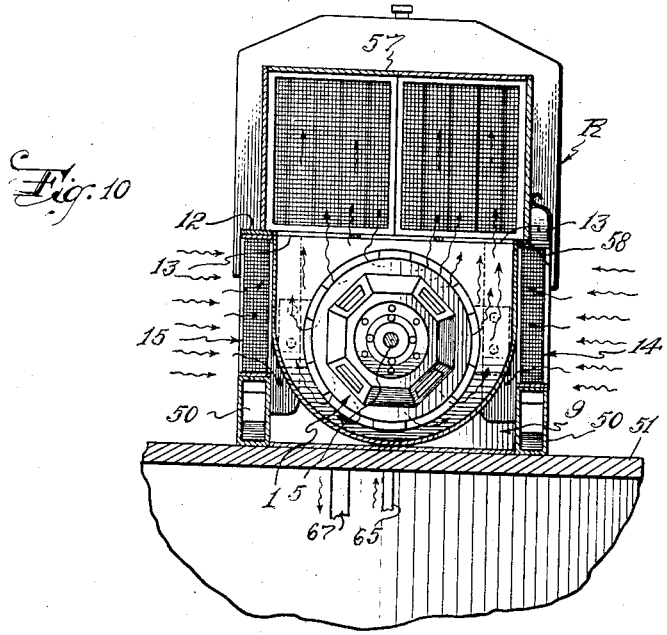
INVENTOR.
Kibbey W. Couse.
BY
A. D. T. Libby
Attorney.

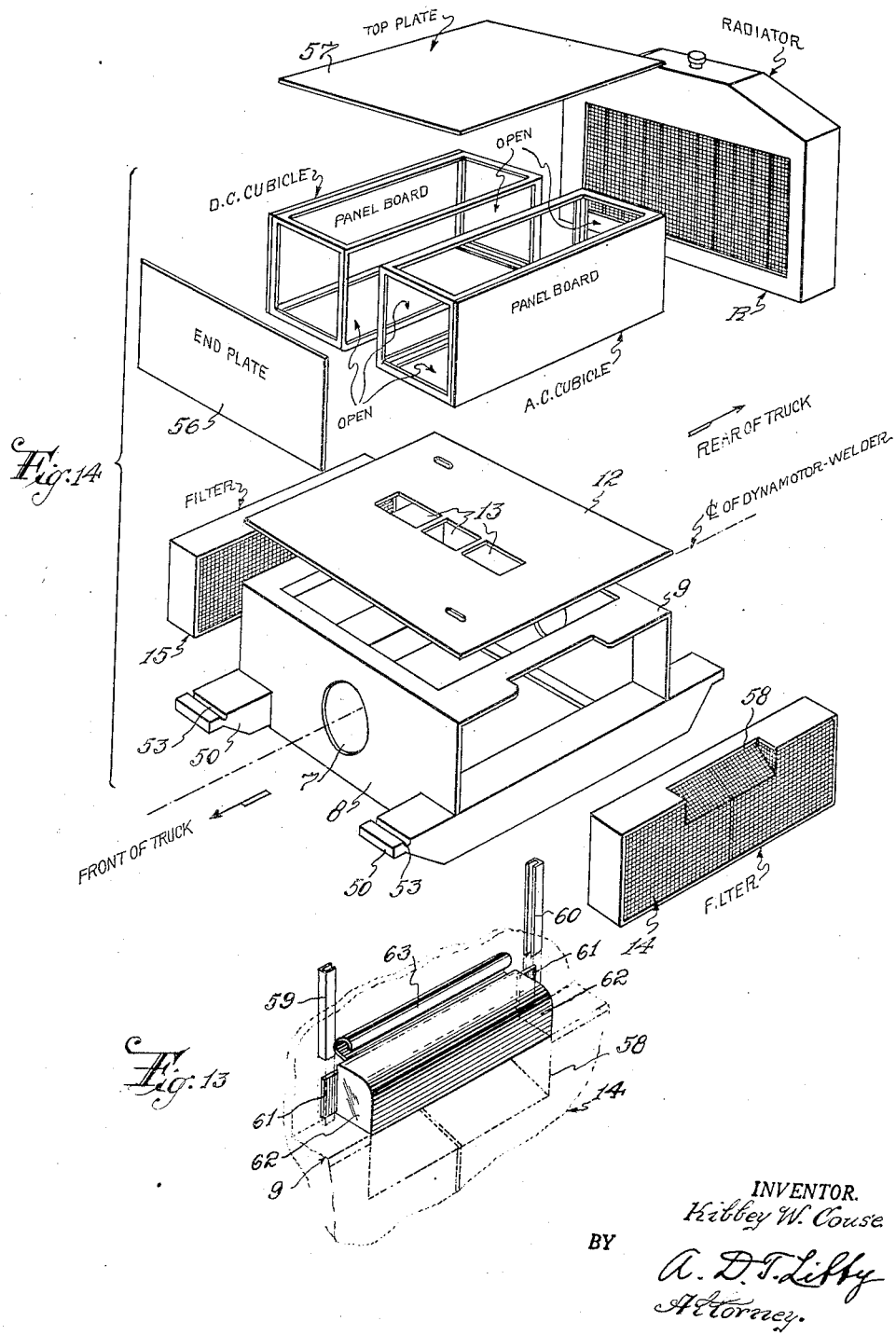

Patented Oct. 9, 1945

2,386,597

UNITED STATES PATENT OFFICE 2,386,597

POWER STRUCTURE

Kibbey W. Couse, Newark, N. J.

Application April 15, 1944, Serial No. 531,198

7 Claims. (Cl. 290—1)

This invention relates to a unitary power structure especially adapted for use with a traveling machine shop of the general type shown in my Design Patent No. D-109,942, issued May 31, 1938.

The complete structure to be herein described consists of a plurality of units, of which the principal ones are a welding generator connected in a manner to be described to an electrical machine that may function both as a motor and a generator under different conditions of operation, and may thus be generally referred to as a dynamotor. Such a combination structure is set forth in my Patent No. 2,333,469, issued November 2, 1943, to which reference will be later made. However, with such a structure, it has been the practice heretofore to have the control panels for both electrical machines at a distance from the machines themselves, thereby necessitating the running of wires through the shop, making it a difficult and expensive installation because of the limited space and large amount of apparatus carried by the traveling machine shop.

It is therefore the principal object of my present invention to combine the motor generator set, its control panels and other apparatus into a completely assembled structure which may be more advantageously installed on the shop or truck, and at the same time provide a unit which may be bodily removed from the truck for use elsewhere, thereby making a highly useful structure for army-type of machine shops or repair trucks.

Another object of my invention is to provide a power structure of greater flexibility and usefulness than that described in my Patent 2,333,469.

Other objects will appear from reading the following specification taken in connection with the annexed drawings wherein:

Figure 1 is a perspective view of the complete power structure.

Figure 2 is a part-sectional and part-elevational view through one end of the motor generator structure. It is like Figure 1a of my Patent 2,333,469, except for certain details which will be later described.

Figure 3 is a fragmentary, part-sectional, part-elevational view at the point marked X in Figure 2.

Figure 7 is a view similar to Figure 4, but of the opposite side of the structure.

Figure 8 is a top plan view of the structure with a small portion broken away at one end to show the rear walls of two of the panel units.

Figure 9 is a view on a horizontal plane approximately through the median line, partly in section and partly in elevation, the radiator shown at the right of Figure 1 being omitted.

Figure 10 is a vertical section through the structure approximately centrally of the motor generator set, the end of the welding generator being shown in full line, the arrows indicating the flow of air.

Figure 12 is a top plan view of the motor generator casing or housing per se, but with the upper part of the housing, forming the cubicles, in section.

Figure 13 is a perspective view of the closure means for the binding posts on the A. C. panel, showing its relative position with respect to the adjacent air filter.

Figure 14 is an exploded and diagrammatic view of the casing or housing parts for the motor generator set and related apparatus including the radiator.

Figure 4:
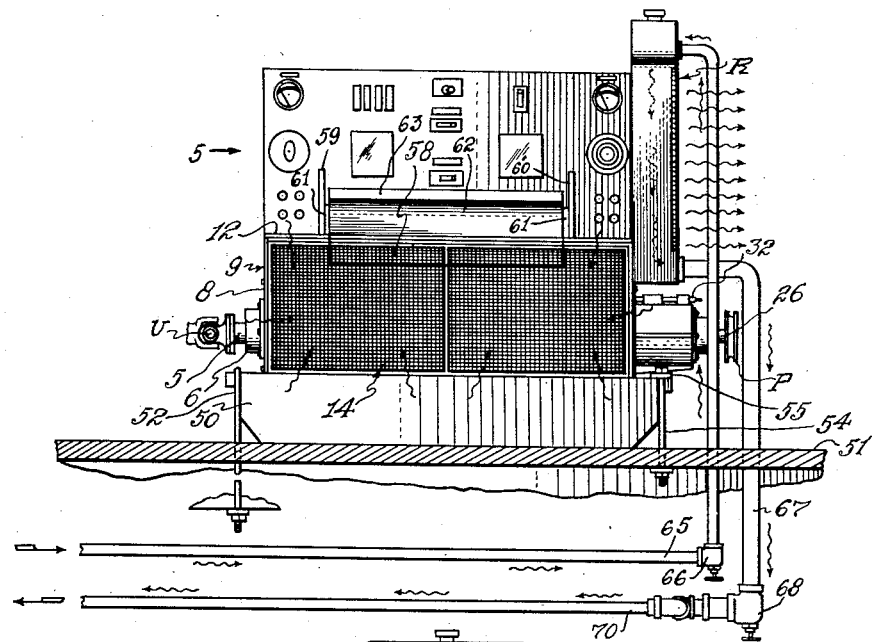
Figure 4 is a side elevation of Figure 1 with arrows showing the direction of air and water flow.
Figure 5:
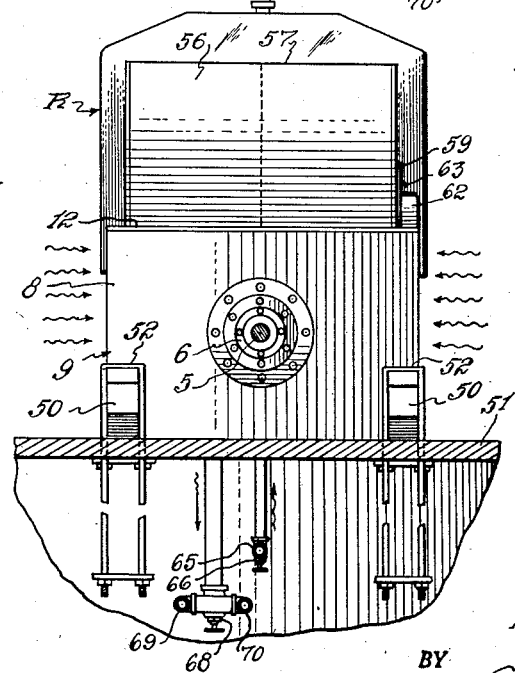
Figure 5 is a view of Figure 4 looking in the direction of the arrow 5.
Figure 6:
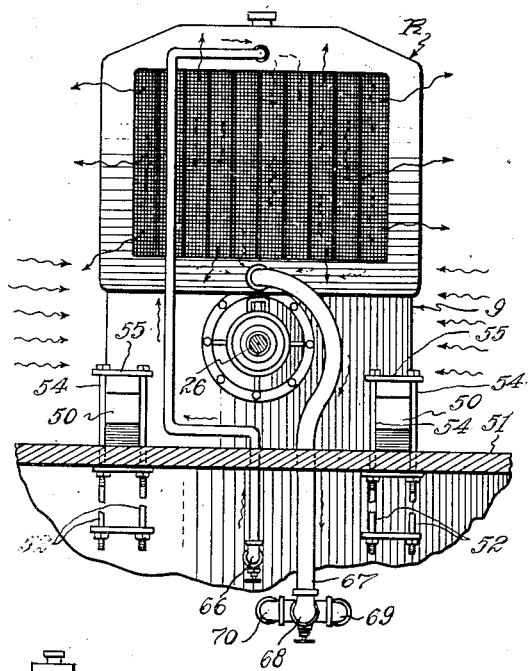
Figure 6 is a view of Figure 4 looking from right to left, with certain of the parts omitted.

In the various views, wherein like numbers refer to corresponding parts, the power structure includes a motor generator set which is composed of an electrical machine 1 which may be used both as a motor or as a generator and may therefore be generally referred to as a dynamotor. This machine is preferably a three-phase machine of the synchronous type. I prefer to use this type of machine for, when running as a motor, it will retain its synchronous speed and will not slip under the load which it is designed to carry, whereas an induction motor has a certain amount of slippage. The further advantages of such a machine are set forth in my patent to which reference has been made.

The D. C. welding generator 2 is designed to deliver welding current from approximately forty to eighty volts. The rotating parts of both of the machines 1 and 2 are carried on a hollow shaft 3 (see Figure 2) which extends all the way through the motor generator and has suitable bearings, one of which is in the end plate 4 but is not shown in the drawings. Positioned within the hollow shaft 3 is a drive shaft 5 having an outer bearing 6 that is positioned in an orifice 7 in the end plate 8 of a steel housing member 9 which houses the motor generator set.

Between the machines 1 and 2, there is provided an air chamber 10 having a fan 11 connected to the hollow shaft 3 for forcing air through the two machines. The housing 9 is substantially closed by a steel plate 12 except for orifices 13 which are in alignment with the air chamber 11, allowing the air from the machines to be forced through the orifices 13 into the cubicles A. C. and D. C., the front ends of which are closed by an end plate 56, and the tops of both by a common top plate 57. The air is forced on through the rear ends of the A. C. and D. C. cubicles and into and through the radiator R. Air is taken into the casing 9 through filters 14 and 15 which are mounted on opposite sides of the casing 9.

In completing the motor generator, reference is made to Figures 2 and 3, wherein it is seen that a casing 16, having a flange 16', is fastened by a plurality of bolts or studs 17 to the end plate 4 of the generator 2. The ends of both the hollow shaft 3 and drive shaft 5 project into the casing 16. The extremity of the drive shaft 5 is supplied with a plurality of splines 19 on which is slidably mounted a coupling 20, but which is non-rotatably positioned on the shaft 5 by means of the splines 19. The coupling 20 has, around its outer periphery, gearlike teeth or splines 22 which are substantially the full length of the teeth or splines 18 and 18' on the respective couplings 21, carried on the end of the hollow shaft 3, and 30 carried on the shaft 26. The teeth or splines on all three parts are similar in form and preferably have a slight curvature to promote easy engagement between the splined coupling 20 and its co-operating parts, which also gives a certain amount of flexibility. The length of the teeth or splines 22 is a detail differing from that of Figure 1a of my patent to which reference will be later made.

Positioned over the end of the hollow shaft 3 and over the hub on the coupling 21, is a ring 23 carrying a plurality of studs 24, four being used, and these project through the coupling 21 so as to engage one side of the slidable coupling 20. The casing 16 carries a bearing 25 that in turn supports a shaft 26 which may be termed an output shaft. The shaft 26 is in axial alignment with the hollow shaft 3 and the drive shaft 5. Any wear on the bearing 25 may be taken up by the adjusting nut 28 and lock nut 29. The inner end of the shaft 26 carries the toothed coupling 30 which is similar to and is adjacent the coupling 21.

A ring 31, like the ring 23, is provided and carries the same type of pins 24 as carried by the ring 23, and these pins pass through the coupling 30 into cooperative relation with the opposite side of the coupling 20. The casing 16 supports, through suitable mounting members, a coupling-shift rod 32 that is operated by a lever in the cab of the truck. The rod 32 carries a member 33 which in turn has oppositely disposed forks 34 and 35 for engagement with the rings 23 and 31. If desired, the forks 34 and 35 may have fastened thereto pads of hard or wear-resisting material, or the rings 23 and 31 themselves may be constructed of wear-resisting material.

The end of the rod 32 is provided with annular recesses or grooves 37, 48 and 38, within which a ball 39 is positioned, the ball being pressed into one or the other of these grooves by a spring 40. This is for the purpose of self-aligning the operating rod 32 and positioning the forks 34 and 35 so they will slide out of engagement with the rings 23 and 31 after a coupling shift has been made, as will be presently described.

Figure 11:
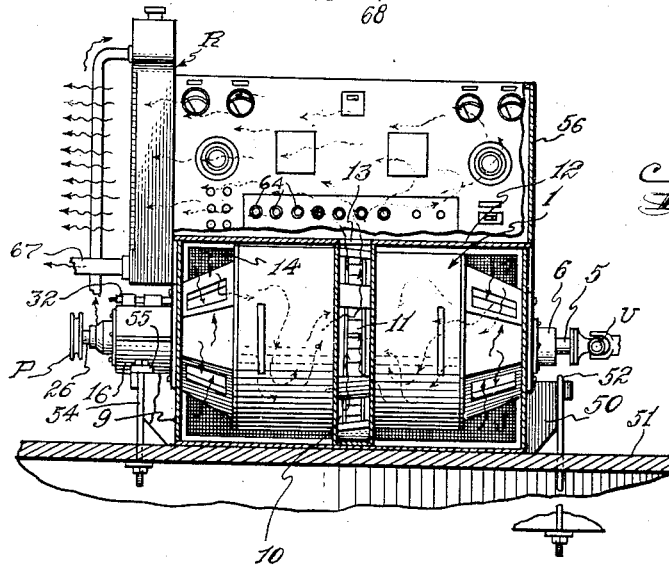
Figure 11 is a view of Figure 7 with certain of the parts cut away to show the interior construction.

The drive shaft 5 may be connected through a universal joint U with a power take-off structure such as shown in my application Serial No. 528,393, filed March 28, 1944; or it may be connected to a shaft going directly to the truck transmission. The shaft 26, as shown in the different figures, for example Figure 11, is provided with a pulley P for driving some piece of apparatus such as an air compressor; or, in case of emergency, it may be connected to the shaft going to the differential since the power shifts illustrated in Figure 2 will provide this sort of a drive as disclosed in my Patent 2,333,469.

It will be noted that the motor generator set is carried on a pair of skids 50 which are adapted to be fastened to the floor or platform 51 of the truck or shop by means of U-bolts 52 which fit in channels 53 to assist in preventing longitudinal motion of the power structure on the floor or platform 51. Studs 54 and straps 55 may be used at the rear ends of the skids 50 to hold these ends to the floor 51. By having the housing 9 fastened securely to the skids 50, the whole structure may be handled more expeditiously when it is desired to use it off the truck.

It will be further noted that the filter 14 has a slanting formation 58 adjacent the A. C. cubicle, and at the ends of this formation there are fastened to the housing 9 a pair of channel-shaped guides 59 and 60, within which are positioned the projecting ends 61 of a cover 62 having a roll-type handle portion 63 for sliding the cover 62 upwardly in the guides 59 and 60 in order to expose the terminals on the A. C. panel so that electrical conductors may be readily attached to their cooperative terminals. The formation 58 is so made that these conductors or cables will pass upwardly under the edge of the cover 62 to the panel board.

The panels for both the A. C. and D. C. cubicles are provided with instruments such as voltmeters and ammeters, rheostats, etc., which it is not necessary to describe in detail, but it may be mentioned that the D. C. cubicle panel carries a plurality of connectors 64 for the heavy outgoing welding cables of the welding generator 2.

The radiator R, mounted on the rear end of the structure, is connected from the engine cylinder bulkhead to the main truck engine radiator by an intake pipe 65 through a control valve 66. The return from the radiator R to the main truck radiator is by way of a pipe 67 and valve 68. Preferably, two pipes 69 and 70 extend from the valve 68 to the truck radiator. It will be noted that the pipe 67 is considerably larger than the pipe 65 going to the radiator R; in fact, I prefer the pipe 67 to be twice the size of the intake or feed pipe 65 so that the radiator R may be quickly drained. Furthermore, the water carried by these pipes and the radiator R forms an auxiliary source of water supply for the main engine-cooling system. The reason for dividing the return pipe 67 into two parts after it leaves the valve 68, is so that these smaller pipes may be more advantageously installed on the truck or machine shop than one large pipe which might interfere with the installation of some other machine or piece of apparatus.

While the air coming from the motor generator set through the radiator R is warm, it is in most cases far from hot, and consequently acts to cool the water which is drawn from the very hot parts of the engine cylinder block. In addition, the warm air, as it passes through the radiator, is utilized to heat the interior of the shop or some area outside the shop which has been covered by a canvas as disclosed in my application Serial No. 464,132, filed October 31, 1942. In addition, the shop or truck may be in a very cold locality, such as Iceland, where the hot air from the motor generator set, passing through the radiator R, acts to warm the water coming from the engine. Also, the radiator R acts to cool the main engine when the truck is standing still and the engine is being operated in the manner to be now described.

By reference to Figure 2, it will be seen that when the drive shaft 5 is being driven from the shop or truck engine, and the coupling 20 is moved to the left to be in full engagement with the coupling 21, the hollow shaft 3 is then being driven, which puts the welding generator 2 and the dyna-motor 1 into operation for the purposes desired. By shifting the coupling member 29 in full engagement with the coupling member 30, the truck engine then drives the air compressor or other pieces of apparatus driven by the pulley P. If the coupling 20 is moved to the central position—whereby the ball 39 is in the groove 48 and the splines or teeth on the coupling 20 are in mesh with the teeth 18 and 18' on the coupling members 21 and 30—the engine then drives both units of the motor generator set as well as the shaft 26 carrying the pulley P.

With the truck engine not operating, and provided there is a source of power for the dyna-motor 1, this is driven as a motor to operate the welding generator. It will be understood that in this condition, the coupling 20 is moved out of engagement with the coupling 21 that is connected to the hollow shaft 3 carrying the rotors of both the machines 1 and 2. Furthermore, the motor 1 may operate the coupling 20 in the position indicated in Figure 2, provided the drive shaft 5 is connected to the engine through transmission, whereby the engine may be disconnected.

From what has been said, it will be seen that I have provided a compact, unitary power structure having several operating and highly advantageous features.

What I claim is:

1. A unitary power structure comprising a pair of interlinked electrical power units with an air chamber and fan positioned between the units and operated by a rotating part of at least one of said units, a housing for enclosing the units, a pair of cubicles positioned back to back on the top of said housing, one cubicle having on its outer side a control panel for one of the units, and the other cubicle having on its outer side a control panel for the other unit, and a top closure plate over both cubicles, the opposite sides of said housing having air filters through which air is taken and circulated by said fan through the units and out by way of the air chamber through the cubicles.

2. A unitary power structure comprising a pair of interlinked electrical power units with an air chamber and fan positioned between the units and operated by a rotating part of at least one of said units, a housing for enclosing said units, skids for carrying the units and housing, a pair of cubicles positioned on the top of said housing, the cubicles carrying control panels, one for each unit, and a top closure plate over both cubicles, the opposite sides of said housing having air intakes through which air is taken and circulated by said fan through the units and into the air chamber, and then out through the rear end of the cubicles.

3. A unitary power structure comprising a pair of interlinked electrical power units with an air chamber and fan positioned between the units and operated by a rotating part of at least one of said units, a housing for enclosing said units, skids for carrying the units and housing, a pair of cubicles positioned back to back on the top of said housing, the outer opposite sides of the cubicles being control panels for said units, while the corresponding sides of the housing are constructed so as to pass air therethrough and into said units and into the air chamber and then out through the cubicles.

4. A unitary power structure comprising a pair of interlinked electrical power units with an air chamber and fan positioned between the units and operated by a rotating part of at least one of said units, a housing for enclosing the units, a pair of cubicles positioned back to back on the top of said housing, one cubicle having on its outer side a control panel for one of the units, and the other cubicle having on its outer side a control panel for the other unit, and a top closure plate over both cubicles, the opposite sides of said housing having air filters through which air is taken and circulated by said fan through the units and out by way of the air chamber through the cubicles, and a slidable shield and cover plate associated with one of said panels for the purpose described.

5. A power structure for a traveling work shop including a propelling engine comprising a pair of interlinked electrical power units with an air chamber and fan positioned between the units and operated by a rotating part of at least one of said units, a housing for enclosing said units, a pair of skids forming part of the unitary structure and carrying all the other units, the skids at the front end of the structure having cross-channels to receive holding devices from the shop floor to prevent, in part, longitudinal movement of the structure on the floor of the shop, a pair of cubicles positioned on the top of said housing and each having an outwardly positioned control panel, while the housing below said panels has air filters, and an auxiliary radiator for said engine interconnected with the housing and cubicles whereby air from the air chamber is forced through the cubicles and through the auxiliary radiator.

6. A power structure, for an automotive traveling work shop including a propelling engine having a main radiator, as set forth in claim 1, further defined in that a radiator, acting as an auxiliary, is mounted on one end of the structure to receive the air coming through the cubicles, the auxiliary radiator being piped to the main radiator of the work shop driving engine.

7. A power structure, for an automobile traveling work shop including a propelling engine having a main radiator, as set forth in claim 1, further defined in that a radiator, acting as an auxiliary, is mounted on one end of the structure to receive the air coming through the cubicles, the auxiliary radiator being piped to the main radiator of the work shop driving engine, and further defined in that a return pipe extends from the bottom of the auxiliary radiator and is much larger in diameter than the pipe leading to the top of the auxiliary radiator as and for the purpose described.

KIBBEY W. COUSE.